United States Patent

Palazzetti

[15] 3,660,790

[45] May 2, 1972

[54] ELECTRICAL INDUCTIVE/CAPACITIVE COMPONENT

[72] Inventor: Mario Palazzetti, Turin, Italy

[73] Assignee: Fiat Societa per Azioni, Turin, Italy

[22] Filed: July 15, 1970

[21] Appl. No.: 55,185

[30] Foreign Application Priority Data

July 16, 1969 Italy ................................52670 A/69

[52] U.S. Cl. ..........................................336/69, 123/148 D

[51] Int. Cl. ..........................................................H01f 15/14

[58] Field of Search ....................123/146.5, 146.5 A, 148 A, 123/148 DC, 148 C, 148 D; 317/157.6; 336/69, 70

[56] References Cited

UNITED STATES PATENTS

| | | | |
|---|---|---|---|
| 3,078,411 | 2/1963 | Book | 336/69 UX |
| 3,210,703 | 10/1965 | Lockie | 336/69 |
| 1,460,390 | 7/1923 | O'Leary | 336/69 X |
| 2,377,353 | 6/1945 | Messerschmidt | 123/148 D |
| 3,191,103 | 6/1965 | Segall | 336/69 X |

*Primary Examiner*—Laurence M. Goodridge
*Attorney*—Sughrue, Rothwell, Mion, Zinn & Macpeak

[57] ABSTRACT

A component for providing both inductive and capacitive properties is formed by at least two interleaved spiral coils insulated from each other and each provided with a respective terminal, one of which is an input and the other an output terminal. The component has inductive and capacitive properties, or purely capacitive properties, according to the spacing between the terminals, if any, measured along the spirals.

3 Claims, 7 Drawing Figures

INVENTOR
MARIO PALAZZETTI
BY Sughrue, Rothwell, Mion, Zinn & Macpeak
ATTORNEYS

INVENTOR
MARIO PALAZZETTI
BY Sughrue, Rothwell, Mion, Zinn & Macpeak
ATTORNEYS

INVENTOR
MARIO PALAZZETTI
BY Sughrue, Rothwell, Mion, Zinn & Macpeak
ATTORNEYS

ELECTRICAL INDUCTIVE/CAPACITIVE COMPONENT

This invention relates to an inductive-capacitive electrical component, particularly, but not exclusively, for ignition circuits of internal combustion engines.

One object of this invention is to provide an electrical component able to function as an inductance and capacitance or solely as a capacitance and preferably with a relation between the values of the inductance and the capacitance included within a wide range.

Another object of the invention is to provide an inductive-capacitive component which permits the realization of an integrated structure such as a transformer.

According to the present invention there is provided an electrical component having inductive and/or capacitive properties characterized in that it comprises at least two coils wound side-by-side and electrically insulated from each other, each coil being wound in a spiral, respective input and output terminals positioned on the coils at a distance apart, measured along the spirals, dependent upon the behavior, capacitive or inductive or both, required of the component, the value of the inductance being determined by a portion of the spiral coils included between the said terminals and the value of the capacitance being determined by coupling between the entire coils.

The position of the terminals is naturally chosen in relation to practical requirements. Thus, one terminal can be located in an intermediate position of one of the spiral coils and another can be located at one of the ends of, or in another intermediate position on, another spiral coil. The terminals can also be provided at the two opposite ends of the spiral coils or at adjacent ends thereof.

According to a preferred embodiment, the coils are formed by laminar elements (that is, elements having extended surfaces) coaxially wound in spiral form.

When it is to function as an inductive-capacitive component, the component can be provided with coils of ferromagnetic material. In such case the component finds an advantageous use in an electronic ignition circuit, having a high tension coil and a discharge capacitor, for internal combustion engines: the component of the invention enables the realization, in a single integrated unit, of both the discharge capacitor and the high tension coil.

Further characteristic features and advantages of the invention will be apparent from the following description, given merely by way of a non-limiting example, with reference to the attached drawings, in which.

Figure 2:
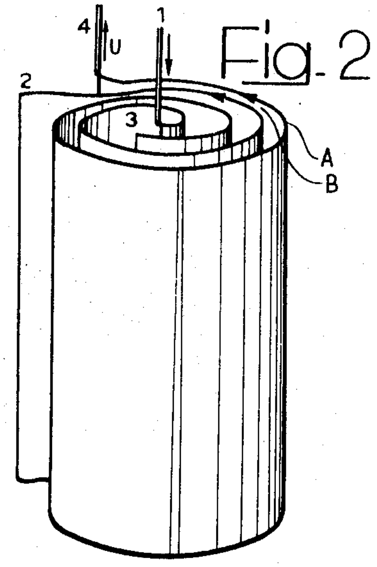
FIG. 2 illustrates diagrammatically an embodiment of an inductive-capacitive component according to the invention.
Figure 2A:
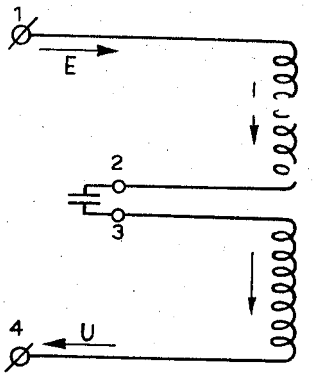
Figure 3:
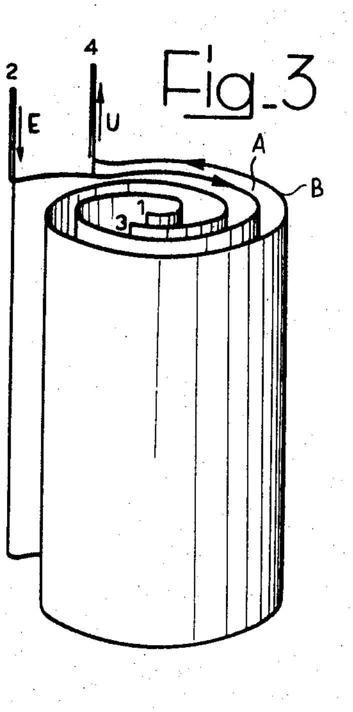
Figure 3A:
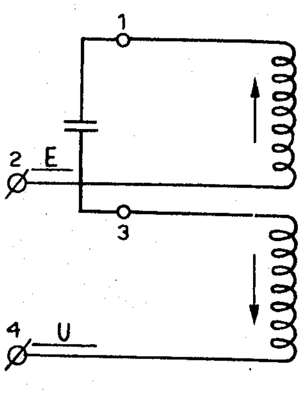
Figure 4:
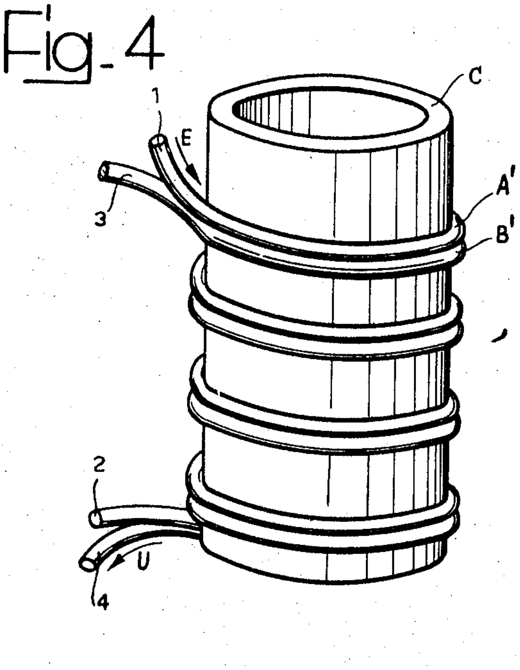
Figure 5:
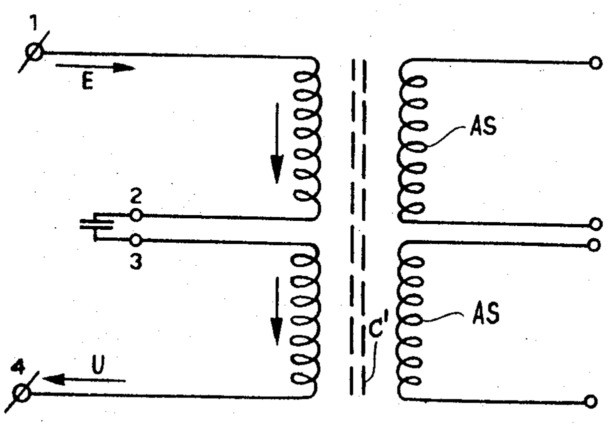

FIG. 2*a* is an electrical equivalent circuit of the component of FIG. 2;

FIG. 3 shows diagrammatically a purely capacitive form of a component according to another embodiment of the invention;

FIG. 3*a* is a schematic electrical equivalent circuit of the component of FIG. 3;

FIG. 4 shows diagrammatically yet another embodiment of an inductive-capacitive component in accordance with the invention, and FIG. 5 is an electrical equivalent circuit of the component of FIG. 2*a*, with additional coils.

Throughout the drawings, the same reference numerals are used to indicate the same or corresponding component parts.

In the description which follows, E and U respectively indicate input and output terminals of the component, the arrows indicating the direction of current flow in use of the component.

FIGS. 1*a*, 1*b*, 1*c*, and 1*d* show a component with two coils *a* and *b* which are shown in linear development. In practice each coil *a* and *b* is wound spirally.

The coils *a* and *b* are arranged side-by-side and interleaved, the coils being electrically insulated. L represents the length of the linear development of each spiral and coil and N the number of turns which form each spiral coil, the opposite ends of one coil being indicated by 1 and 2 and the opposite ends of the other coil being indicated by 3 and 4.

Figure 1:
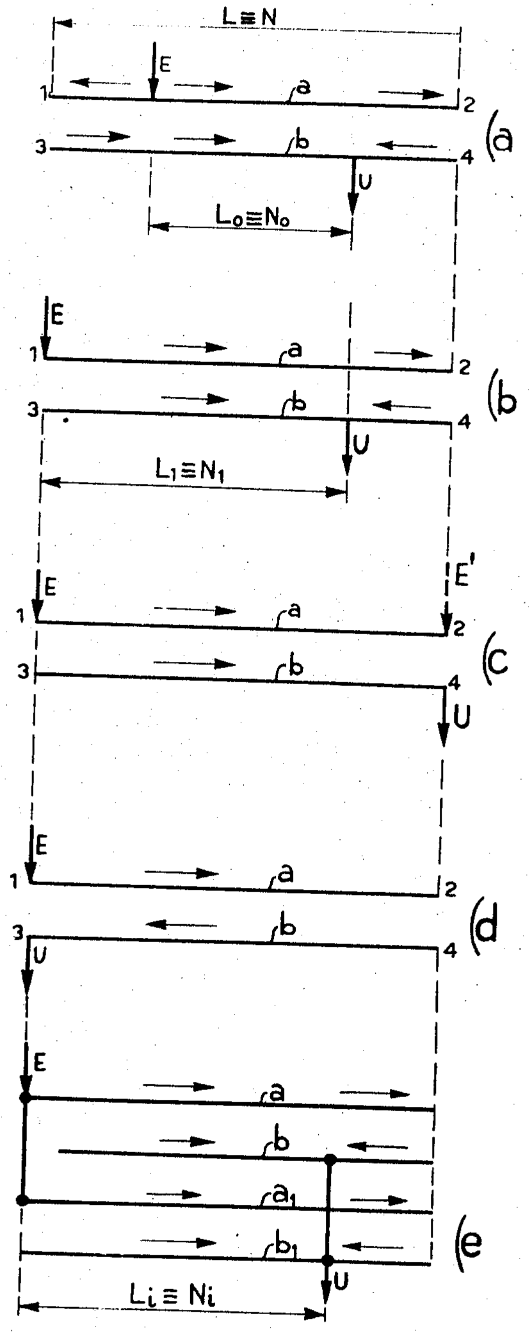
FIG. 1 shows a series of diagrams illustrating the principle of the component according to the invention.

FIG. 1*a* shows the most general arrangement of the terminals E and U. The input terminal E of the coil *a* and the output terminal of the coil *b*, are each located at an intermediate point of the respective spiral, the two intermediate ponts being distant $L_0$ from each other as measured along the spirals, the number of turns between the input and output terminals E and U being $N_0$.

The electrical currents flowing in the coils *a*, *b* will have the same direction in the intermediate stretch between the terminals E and U, but opposite directions in the adjacent stretches outwardly of the intermediate stretch (FIG. 1*a*). Consequently, only in the stretch $L_0$ will the resultant magnetic flux produced by the coils *a* and *b* be other than zero.

The capacitance of the component is determined by the electrostatic coupling between the two entire coils *a* and *b*, while the inductance is determined by the number of turns $N_0$ and the length $L_0$ of the intermediate stretch between the terminals E and U.

It will therefore be understood how, for a given capacitance, by a variation of the length $L_0$ of the intermediate stretch, it is possible to obtain a component with various inductance values.

In FIG. 1*b* the input terminal E is applied at the end 1 of the coil *a* giving an inter-terminal distance $L_1$ and a number of turns $N_1$, greater than $L_0$, $N_0$. Consequently the inductance of the component of FIG. 1*b* is greater than that of the component of FIG. 1*a*.

Still with the same capacitance, the inductance of the component has its maximum value in FIG. 1*c* where the input and output terminals E and U are applied at the opposite ends 1 and 4, of the two coils *a* and *b* respectively: the resulting magnetic flux is that due to the entire length of the spiral, that is to the total number of turns, N.

The inductance of the component when arranged as shown in FIG. 1*d* is zero: the two terminals E and U are applied at adjacent ends (1 and 3) of the coils *a* and *b*.

FIG. 1*e* shows a component with four coils *a*, $a^1$, *b*, and $b^1$ connected in parallel to the respective terminals E and U, the position of the latter corresponding to that of FIG. 1*b*. The inductance is that due to the inductance of the $N'_1$ turns of the coils in parallel, included in the intermediate stretch of length $L'_1$, between the terminals E and U, while the capacitance is that which results from the four interleaved coils in parallel.

Arrangements such as that shown in FIG. 1*e* are obviously advantageous when an inductive-capacitive component having a high figure of merit is required.

In embodiment of FIG. 2, which corresponds to the arrangement shown diagrammatically in FIG. 1*c*, the coils *a*, *b* are formed by two laminar elements, foils A and B, disposed face-to-face and wound spirally in two interleaved coils, the foils being electrically insulated from each other.

As regards the type of coil and the choice of the terminals E and U, the component of FIG. 2 has a great capacitance and a small inductance. The value of the cpapcitance depends, inter alia on the geometrical configurations of the coils and on their total interleaved length in the spiral, according to the well-known laws of electrical engineering. The value of the inductance, given the positions of the terminals E and U at the two opposite ends 1 and 4, depends on the total number of turns contributing to the reluctance of the magnetic circuit, as for ordinary wound conductors.

In practice the invention provides a component which, in a single unit, combines two components of an oscillatory circuit, that is, a capacitance and an inductance, in which capacitance-inductance ratio can be varied according to the positioning of the terminals E and U along the spiral coils.

In the embodiment of FIG. 3, the terminals E andU are located at adjacent ends (2 and 4) of the spiral coils, corresponding to the arrangement shown diagrammatically in FIG. 1*d*. The component in this case, hasvirtually solely a capacitive function, since the resultant magnetic flux deriving from it is effectively nil. Such a component finds utility in all those circuits comprising a capacitor and a coil in proximity, in which the inductance of the coil must be unaffected by the presence of the capacitor.

In particular, in the traditional ignition circuit of an internal combustion engine it is convenient for the capacitor which is connected in parallel across the make-and-break contacts to be mounted on the high tension coil to form a single structural unit. By forming the capacitor in accordance with FIG. 3 any possibility of inductive coupling between the coils forming the capacitor and the inductance of the high tension coil is practically excluded.

In the embodiment of FIG. 4, the two spiral coils of the component according to the invention are formed by twin wires A′ and B′, formed by electrical conductors arranged side-by-side and electrically insulated from each other, the wires being wound as shown, for example, in a cylindrical helix.

The terminals Eand U are applied at opposite ends 1 and 4, of the respective wires A′ and B′, corresponding to the schematic arrangement of FIG. 1*c*. Since, in this case, the coils are formed by simple coiled conductors, it will be realized that the component can achieve a relatively high inductance compared with the previously described embodiments. The wires A′and B′ are wound around a support C of ferro-magnetic material so as to increase the inductance of the component.

It will be appreciated that supports, both ferro-magnetic and non-magnetic, can also be used to support the coils A and B in the embodiments of FIGS. 2 and 3.

FIG. 5 illustrates the electrical equivalent circuit of the component of FIG. 2 with coils wound around a ferro-magnetic support C′ which also forms a core for additional coils AS. This arrangement realizes, according to an important aspect of this invention, an integrated structure comprising a transformer having secondary windings formed by the coils AS.

In the integrated structure of FIG. 5 with or without the ferro-magnetic core according to the magnetic coupling required, the advantages according to the invention are evident. For instance in electronic ignition circuits which operate by discharge of a capacitor, such as those currently envisaged in motor vehicles, the discharge capacitor and the high tension coil can be realized advantageously in a single physical and electrical unit, with consequent reduction of both space and expense. Such reductions are essentially due to :

i. the fact that a single container receives both the capacitor and the coil, with noticeable advantages because both the capacitor and the coil can share the same insulating oil;

ii. the elimination of the primary coil and its associated connections.

It is moreover possible to wind the capacitor with large diameters, with advantages of both simple manufacture and quality.

In preceding description reference has been made, merely by way of example, to some embodiments of the component according to this invention, but it will be understood that other embodiments are possible, according to particular practical requirements, without nevertheless departing from the scope of the invention as defined in the claims.

For example, instead of only two terminals Eand U, the component could have other numbers of terminals. Thus with a second input terminal E at the end 2 of the coil *a* in FIG. 1*c* (see broken arrow), use could be made of the intermediate point of the series capacitance-inductance, so that using the terminals E and E′ the component is purely inductive, using the terminals E′ and U the component is purely capacitive and, as previously described, using the terminals E and U the component behaves as a capacitance and inductance in series.

Also the applications of the component according to the invention are clearly not limited to the automotive field, but extend to various fields of application in electrical engineering and electronics.

I claim:

1. An electric inductive-capacitive component, comprising:

a. a first plurality of conductive coils spirally wound in side-by-side insulated relationship, having respective points connected to one another and to a first common terminal wherein a signal is applied to said first common terminal;

b. a second plurality of conductive coils spirally wound in an interleaved pattern with the first plurality of coils, insulated from one another and from the first plurality, and having respective points connected to one another and to a second common terminal wherein a signal is extracted from said second common terminal; wherein the inductive characteristics of the component are determined by the distance between the first and second common terminals along the spiral and the capacitive characteristics of the component are determined by the coupling between the two pluralities of coils.

2. The components of claim 1 wherein the coils are formed by respective laminar elements.

3. The component of claim 1 wherein the coils are formed by wires.

* * * * *